(12) United States Patent
DeSimone et al.

(10) Patent No.: US 9,748,604 B2
(45) Date of Patent: Aug. 29, 2017

(54) ION CONDUCTING POLYMERS AND POLYMER BLENDS FOR ALKALI METAL ION BATTERIES

(71) Applicant: The University of North Carolina at Chapel Hill, Chapel Hill, NC (US)

(72) Inventors: Joseph M. DeSimone, Los Gatos, CA (US); Ashish Pandya, Morrisville, NC (US); Dominica Wong, Carrboro, NC (US); Alessandra Vitale, Turin (IT)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 234 days.

(21) Appl. No.: 14/436,603

(22) PCT Filed: Oct. 17, 2013

(86) PCT No.: PCT/US2013/065396
§ 371 (c)(1),
(2) Date: Apr. 17, 2015

(87) PCT Pub. No.: WO2014/062898
PCT Pub. Date: Apr. 24, 2014

(65) Prior Publication Data
US 2015/0288028 A1    Oct. 8, 2015

Related U.S. Application Data

(60) Provisional application No. 61/812,510, filed on Apr. 16, 2013, provisional application No. 61/716,253, filed on Oct. 19, 2012.

(51) Int. Cl.
| | |
|---|---|
| *H01M 10/0565* | (2010.01) |
| *H01M 10/0569* | (2010.01) |
| *H01M 10/0525* | (2010.01) |
| *H01M 10/054* | (2010.01) |
| *H01M 10/0568* | (2010.01) |
| *H01M 8/02* | (2016.01) |
| *H01M 8/1025* | (2016.01) |
| *H01M 8/1039* | (2016.01) |
| *H01M 8/1048* | (2016.01) |
| *H01M 8/1072* | (2016.01) |
| *H01M 12/08* | (2006.01) |
| *H01M 10/052* | (2010.01) |
| *H01M 8/1018* | (2016.01) |

(52) U.S. Cl.
CPC ......... *H01M 10/0565* (2013.01); *H01M 8/02* (2013.01); *H01M 8/1025* (2013.01); *H01M 8/1039* (2013.01); *H01M 8/1048* (2013.01); *H01M 8/1072* (2013.01); *H01M 10/054* (2013.01); *H01M 10/0525* (2013.01); *H01M 10/0568* (2013.01); *H01M 12/08* (2013.01); *H01M 10/052* (2013.01); *H01M 10/0569* (2013.01); *H01M 2008/1095* (2013.01); *H01M 2220/10* (2013.01); *H01M 2220/20* (2013.01); *H01M 2250/10* (2013.01); *H01M 2250/20* (2013.01); *H01M 2300/0034* (2013.01); *H01M 2300/0037* (2013.01); *H01M 2300/0082* (2013.01); *H01M 2300/0091* (2013.01); *Y02P 70/54* (2015.11)

(58) Field of Classification Search
CPC ...... H01M 12/08; H01M 8/02; H01M 8/1025; H01M 8/1072; H01M 10/072; H01M 2008/1095; H01M 2220/10; H01M 2220/20; H01M 2250/10; H01M 2250/20; H01M 2300/0034; H01M 2300/0037; H01M 2300/0082; H01M 2300/0091; H01M 10/0525; H01M 10/0565; H01M 10/054; H01M 10/0568
See application file for complete search history.

(56) References Cited

U.S. PATENT DOCUMENTS

| | | | |
|---|---|---|---|
| 4,178,465 | A | 12/1979 | Caporiccio et al. |
| 4,360,645 | A | 11/1982 | Krespan et al. |
| 4,745,009 | A | 5/1988 | Piacenti et al. |

(Continued)

FOREIGN PATENT DOCUMENTS

| | | |
|---|---|---|
| AU | 2003265336 | 2/2004 |
| CN | 100376602 C | 3/2008 |

(Continued)

OTHER PUBLICATIONS

Armand et al. "Building Better Batteries", *Nature*, 451:7;652-657 (2008).
Howell et al. "The preparation of primary poly-hexafluoropropylene oxide halides (poly-HFPO-CF$_2$X where X=I, Br, Cl and F)", *Journal of Fluorine Chemistry*, vol. 125 Issue 10, 1513-1518 (2004).
International Preliminary Report on Patentability Corresponding to International Application No. PCT/US2014/032363; Date of Mailing: Oct. 15, 2015; 8 Pages.
International Search Report and Written Opinion, PCT/US2014/032363, mailed Jan. 12, 2015, 12 pages.

(Continued)

*Primary Examiner* — Anca Eoff
(74) *Attorney, Agent, or Firm* — Myers Bigel, P.A.

(57) ABSTRACT

Electrolyte compositions for batteries such as lithium ion and lithium air batteries are described. In some embodiments the compositions are liquid compositions comprising (a) a homogeneous solvent system, said solvent system comprising a perfluoropolyether (PFPE) and polyethylene oxide (PEO); and (b) an alkali metal salt dissolved in said solvent system. In other embodiments the compositions are solid electrolyte compositions comprising: (a) a solid polymer, said polymer comprising a crosslinked product of a crosslinkable perfluoropolyether (PFPE) and a crosslinkable polyethylene oxide (PEO); and (b) an alkali metal ion salt dissolved in said polymer. Batteries containing such compositions as electrolytes are also described.

28 Claims, No Drawings

(56) References Cited

U.S. PATENT DOCUMENTS

| | | | |
|---|---|---|---|
| 5,011,751 A * | 4/1991 | Yoneyama | C08G 61/123 429/247 |
| 5,506,279 A | 4/1996 | Babu et al. | |
| 5,612,043 A | 3/1997 | Deprez et al. | |
| 5,618,316 A | 4/1997 | Hoffman et al. | |
| 5,721,070 A | 2/1998 | Shackle | |
| 5,725,802 A | 3/1998 | Chittofrati et al. | |
| 5,777,174 A | 7/1998 | Marchionni et al. | |
| 5,830,600 A | 11/1998 | Narang et al. | |
| 5,900,500 A | 5/1999 | Turri et al. | |
| 6,096,692 A | 8/2000 | Hagihara et al. | |
| 6,190,574 B1 | 2/2001 | Nakagawa et al. | |
| 6,413,676 B1 | 7/2002 | Munshi | |
| 6,515,075 B1 | 2/2003 | Balogh et al. | |
| 6,608,138 B2 | 8/2003 | Carignano et al. | |
| 6,734,264 B1 | 5/2004 | Amin-Sanayei | |
| 6,797,437 B2 | 9/2004 | Tsukamoto et al. | |
| 6,844,134 B2 | 1/2005 | Choi et al. | |
| 6,896,996 B2 | 5/2005 | Marchionni et al. | |
| 6,958,256 B2 | 10/2005 | Rogalli et al. | |
| 7,294,731 B1 | 11/2007 | Flynn et al. | |
| 7,370,962 B2 | 5/2008 | Roffman et al. | |
| 7,429,409 B2 | 9/2008 | Husemann | |
| 7,476,468 B1 | 1/2009 | Lam et al. | |
| 7,482,098 B2 | 1/2009 | Tsukamoto et al. | |
| 7,608,600 B2 | 10/2009 | Storer et al. | |
| 7,732,100 B2 | 6/2010 | Wakihara et al. | |
| 7,790,312 B2 | 9/2010 | Costello et al. | |
| 7,897,080 B2 | 3/2011 | Yang et al. | |
| 7,989,566 B2 | 8/2011 | Coughlin et al. | |
| 8,080,615 B2 | 12/2011 | Millward | |
| 8,084,405 B2 | 12/2011 | Howell et al. | |
| 8,133,580 B2 | 3/2012 | Dias et al. | |
| 8,158,728 B2 | 4/2012 | DeSimone et al. | |
| 8,197,943 B2 | 6/2012 | Pinto et al. | |
| 8,337,986 B2 | 12/2012 | Moorlag et al. | |
| 8,361,620 B2 | 1/2013 | Zang et al. | |
| 8,409,177 B1 | 4/2013 | Lai | |
| 8,475,688 B2 * | 7/2013 | Chen | H01M 4/382 252/519.31 |
| 8,802,301 B2 | 8/2014 | Halalay et al. | |
| 9,540,312 B2 | 1/2017 | Teran et al. | |
| 9,543,619 B2 | 1/2017 | Teran et al. | |
| 2002/0127475 A1 | 9/2002 | Marchionni et al. | |
| 2003/0027732 A1 | 2/2003 | Howell et al. | |
| 2003/0215719 A1 | 11/2003 | Navarrini et al. | |
| 2004/0141150 A1 | 7/2004 | Roffman et al. | |
| 2009/0023038 A1 | 1/2009 | DeSimone et al. | |
| 2009/0086408 A1 | 4/2009 | Koh et al. | |
| 2009/0111019 A1 | 4/2009 | Hirose et al. | |
| 2009/0134353 A1 | 5/2009 | Koh et al. | |
| 2009/0291364 A1 | 11/2009 | Koh et al. | |
| 2010/0047695 A1 | 2/2010 | Smart et al. | |
| 2010/0183889 A1 | 7/2010 | Dams et al. | |
| 2010/0216035 A1 | 8/2010 | Iwanaga et al. | |
| 2010/0240912 A1 | 9/2010 | Okamoto et al. | |
| 2011/0111308 A1 | 5/2011 | Halalay et al. | |
| 2011/0281173 A1 * | 11/2011 | Singh | H01M 2/16 429/306 |
| 2011/0311881 A1 | 12/2011 | Benicewicz | |
| 2012/0082903 A1 | 4/2012 | Zhang et al. | |
| 2012/0141878 A1 | 6/2012 | Ohashi et al. | |
| 2012/0214043 A1 | 8/2012 | Olschimke et al. | |
| 2014/0060859 A1 | 3/2014 | Kountz et al. | |
| 2014/0065461 A1 | 3/2014 | Kountz et al. | |
| 2014/0245760 A1 | 9/2014 | Leck et al. | |
| 2015/0093654 A1 | 4/2015 | Galiano | |
| 2016/0028114 A1 | 1/2016 | Pratt | |
| 2016/0043435 A1 | 2/2016 | DeSimone et al. | |
| 2016/0221926 A1 | 8/2016 | Teran et al. | |
| 2016/0226102 A1 | 8/2016 | Teran et al. | |
| 2016/0226103 A1 | 8/2016 | Teran et al. | |

FOREIGN PATENT DOCUMENTS

| | | |
|---|---|---|
| CN | 101302612 | 11/2008 |
| CN | 102091505 | 6/2011 |
| EP | 1 221 733 | 7/2002 |
| EP | 1 221 733 B1 | 12/2006 |
| EP | 2322586 | 5/2011 |
| FR | 2989683 | 10/2013 |
| JP | H3057106 A2 | 3/1991 |
| JP | 2000327634 A | 11/2000 |
| JP | 2004272161 | 9/2004 |
| JP | 2010044958 | 2/2010 |
| JP | 2011162572 | 8/2011 |
| JP | 2013069531 | 4/2013 |
| JP | 2013258076 | 12/2013 |
| JP | 2014002956 | 1/2014 |
| WO | WO 95/15588 A | 6/1995 |
| WO | WO 9744842 | 11/1997 |
| WO | WO 9826024 | 6/1998 |
| WO | WO 0146746 | 6/2001 |
| WO | WO 2004042453 | 5/2004 |
| WO | WO 2004068196 | 8/2004 |
| WO | WO 2005/081646 A2 | 9/2005 |
| WO | WO 2006/081646 A1 | 8/2006 |
| WO | WO 2007044967 | 4/2007 |
| WO | WO 2009096570 | 8/2009 |
| WO | WO 2010096404 | 8/2010 |
| WO | WO 2010151639 | 12/2010 |
| WO | WO 2011/051275 | 5/2011 |
| WO | WO 2011066830 | 6/2011 |
| WO | WO 2014025317 | 2/2014 |
| WO | WO 2014-036360 | 3/2014 |
| WO | WO 2014-062898 | 4/2014 |
| WO | WO 2014204547 | 12/2014 |

OTHER PUBLICATIONS

Kasai et al. "Degradation perfluoropolyethers catalyzed by aluminum oxide", *Applied Surface Science*, vol. 51, Issues 3-4, 201-211 (1991).

Kim et al. "Electrode Materials for Rechargeable Sodium-Ion Batteries: Potential Alternatives to Current Lithium-Ion Batteries", *Adv. Energy Mater.*, vol. 2, 710-721 (2012).

Pacansky et al. "Electron Beam Irradiation of Polyperfluoroethers: Experimental Analysis of Main-Chain Degradation", *Chem Mater.*, 5, 486-494 (1993).

Paciorek et al. "Stability of perfluoroalkylethers", *Journal of Fluorine Chemistry*, vol. 67 Issue 2, 169-175 (1994).

Proudmore et al. Preparation and Properties of Polyurethane Networks Based on α,ω-Difunctional Poly(hexafluoropropylene oxide), *Journal of Polymer Science: Part A: Polymer Chemistry*, 33, 1615-1625 (1995).

Smart et al. "Improved performance of lithium-ion cells with the use of fluorinated carbonate-based electrolytes" Journal of Power Sources, 119-121, pp. 359-367, 2003.

Kweon et al. "Perfluoropolyether addition Effect on the Properties of Poly(Ethylene Oxide)-Based Solid Polymer Electrolytes", *Korean Chem. Eng. Res.*, vol. 42, No. 6, Dec. 2004, pp. 741-747.

Rolland et al. "Solvent-Resistant Photocurable "Liquid Teflon" for Microfluidic Device Fabrication", *J. Am. Chem. Soc* 126:2322-2323 (2004).

Eweka et al. Electrolytes and additives for high efficiency lithium cycling, *Journal of Power Sources* vol. 65, Issues 1-2, pp. 247-251 (1997) (Abstract Only).

Nair et al. "Methacrylic-based solid polymer electrolyte membranes for lithium-based batteries by a rapid UV-curing process", *Reactive and Functional Polymers*, vol. 71, Issue 4, pp. 409-416 (2011) (Abstract Only).

International Search Report and Written Opinion, PCT/US2013/065396, mailed Jan. 6, 2014.

Kweon et al. "Perfluoropolyether Addition Effect on the Properties of Poly (Ethylene Oxide)-Based Solid Polymer Electrolytes" Korean Chemical Engineering Research 2004; 42(6): 741-747.

Pilati et al. "Poly (ε-caprolactone)-Poly (fluoroalkylene oxide)-Poly (ε-caprolactone) Block Copolymers. 1. Synthesis and Molecular Characterization" Macromolecules 1999; 32: 6969-6976.

(56) References Cited

OTHER PUBLICATIONS

Bongiovanni et al. "Acrylic Polyester Resins Containing Perfluoropolyethers Structures: Synthesis, Characterization, and Photopolymerization" Journal of Applied Polymer Science 2000; 75: 651-659.

Bongiovanni et al. "Perfluoropolyether polymers by UV curing: design, synthesis and characterization" Polym Int 2012; 61: 65-73.

Hu et al. "Photochemically Cross-Linked Perfluoropolyether-Based Elastomer: Synthesis, Physical Characterization, and Biofouling Evaluation" Macromolecules 2009; 42: 6999-7007.

Chi-Chang Chen et al. "Solid Polymer Electrolytes III: Preparation, Characterization, and Ionic Conductivity of New Gelled Polymer Electrolytes Based on Segmented, Perfluoropolyether-Modified Polyurethane", J. Polymer Sci, A: Polymer Chemistry, vol. 40, 2002, pp. 486-495.

European Search Report Corresponding to European Patent Application No. 13 847 827.6; Dated: May 19, 2016; 7 Pages.

Devaux, et al., "Characterizations of nonflammable perfluoropolyether based electrolytes and lithium battery application," (Abstract Only), Conference; Meeting Abstract, 248th ACS National Meeting & Exposition, Aug. 10-14, 2014 (2014), PMSE-541.

Tonelli, Claudio, et al., "Linear perfluoropolyether difunctional oligomers: chemistry, properties and applications," Journal of Fluorine Chemistry, Jun. 1999, 95(1), pp. 51-70.

Wong et al. "Nonflammable perfluoropolyether-based electrolytes for lithium Batteries" PNAS, 111(9), pp. 3327-3331, Mar. 4, 2014.

Final Office Action issued in U.S. Appl. No. 15/012,444, dated Oct. 12, 2016.

Notice of Allowance issued in U.S. Appl. No. 15/012,444, dated Nov. 2, 2016.

Notice of Allowance issued in U.S. Appl. No. 15/012,548, dated Nov. 21, 2016.

Office Action issued in U.S. Appl. No. 15/012,444, dated Jun. 22, 2016.

Office Action issued in U.S. Appl. No. 15/012,548, dated Jul. 25, 2016.

International Search Report and Written Opinion dated Apr. 11, 2016 issued in PCT Application No. PCT/US16/16221.

International Search Report and Written Opinion dated Apr. 11, 2016 in PCT/US2016/16188.

* cited by examiner

ION CONDUCTING POLYMERS AND POLYMER BLENDS FOR ALKALI METAL ION BATTERIES

RELATED APPLICATIONS

This application is a 35 U.S.C. §371 national phase entry of PCT Application PCT/US2013/065396, filed Oct. 17, 2013, and published in English on Apr. 24, 2014, as International Publication No. WO 2014/062898, and which claims the benefit of U.S. Provisional Application Ser. Nos. 61/812,510, filed Apr. 16, 2013, and 61/716,253, filed Oct. 19, 2012, the disclosures of each of which is incorporated herein by reference in their entirety.

GOVERNMENT SUPPORT

This invention was made with government support under Grant No. DE-SC0001011 from the Department of Energy. The US Government has certain rights to this invention.

FIELD OF THE INVENTION

The present invention concerns liquid and solid polymer electrolyte compositions for use in batteries such as lithium-ion batteries, lithium air batteries, sodium-ion, and sodium-air batteries.

BACKGROUND OF THE INVENTION

One of the biggest challenges faced by modern society is to secure sustainable resources that meet burgeoning energy demands (R. Marom et al., *Journal of Materials Chemistry* 21, 9938 (2011)). One area of great interest is developing lithium (Li) batteries suitable for large-scale applications, such as transportation and energy storage (J. Tarascon and M. Armand, *Nature* 414, 359 (November 2001)). Currently, Li-ion batteries are used in electric vehicles (EVs), but factors including cost and longevity limit their prevalence (O. Egbue and S. Long, *Energy Policy* 48, 717 (2012)). Safety is also a primary concern; most commercial Li-ion batteries consist of a flammable mixture of alkyl carbonates that serves as the electrolyte solvent.

In the last decade, there has been extensive efforts to introduce alternative solvents, salts, and additives that can improve the quality and performance of electrolytes (D. Aurbach et al., *Electrochimica Acta* 50, 247 (2004)). The preparation of polyelectrolytes is an emerging area of interest due to their potential lower costs, easy handling, and better safety. Poly(ethylene oxide) (PEO) is the most prominently featured homopolymer in this field due its unique ability to solvate Li-based salts. The crystallinity of PEO, however, hinders ionic conductivity, rendering PEO-LiX electrolytes useful at temperatures between 60° to 80° C. (F. Croce et al., *Nature* 394, 456 (1998)). Dendrite formation at the anode electrode remains a persistant issue, causing shortcircuits and overcharging, which can lead to cell ignition or explosion (S. Tobishima et al., *Journal of Power Sources* 90, 188 (2000); H. Ghassemi et al., *Applied Physics Letters* 99, 123113 (2011)). Accordingly, there is a need for new electrolyte compositions for lithium ion batteries, and other types of alkali metal ion batteries.

SUMMARY OF THE INVENTION

Liquid and solid polymer electrolyte compositions useful in alkali metal batteries are described herein, along with alkali metal ion batteries (including lithium and sodium ion and air batteries) containing the same. In some embodiments, the compositions are advantageously characterized by, one, some or all of: low flammability/high flame resistance; low glass transition temperature, flexibility, high ionic conductivity, and/or a broad electrochemical stability window.

In some embodiments, the composition is a liquid electrolyte composition, comprising, consisting of, or consisting essentially of: (a) a homogeneous solvent system, said solvent system comprising, consisting of, or consisting essentially of a perfluoropolyether (PFPE) and polyethylene oxide (PEO); and (b) an alkali metal salt dissolved in the solvent system. In other embodiments, the composition is a solid electrolyte composition comprising, consisting of, or consisting essentially of: (a) a solid polymer, said polymer comprising, consisting of or consisting of a crosslinked or the crosslinking product of a crosslinkable perfluoropolyether (PFPE) and a crosslinkable polyethylene oxide (PEO); and (b) an alkali metal ion salt dissolved in said polymer.

In some embodiments the alkali metal salt is a lithium salt; in other embodiments the alkali metal salt is a sodium or potassium salt.

Other ingredients, such as standard contaminants found in battery-grade reagents, initiators, and/or electrode stabilizing agents, may optionally be included.

In some embodiments, the composition is free or substantially free of organic carbonate solvent such as loweralkyl carbonate solvents (e.g., contains not more than 5, 4, 3, 2, or 1 percent by weight of organic carbonate solvent).

In some embodiments, the composition has a $T_g$ between −120 or −115° C. and −40 or −20° C.

In some embodiments, the electrolyte compositions do not ignite when heated to a temperature of 235° C. and then contacted to a flame for 15 seconds in a Kohler open cup rapid flash test apparatus.

In some embodiments, the electrolyte compositions have an ionic conductivity of from $10^{-4}$ or $10^{-3}$ to $10^1$ or $10^2$ siemens per centimeter at 25 C.

In some embodiments, the electrolyte compositions have an electrochemical stability window of from 1 or to 6 volts against Li/Li$^+$.

Methods of making the same, along with alkali metal ion batteries containing the same, are also described.

Small amounts of perfluoropolyether polymers as an additive in lithium ion batteries are described in G. Marchionni et al., US Patent Application Publication No. US2002/0127475 (Sep. 12, 2002), and in E. Eweka, J. R. Owen and A. Ritchie, *Journal of Power Sources* 1997, 65, 247-251. In both of these systems, PFPE is only used in small amounts and not as a solvent. In addition, both of these references describe the PFPE as an additive in a carbonate solvent, and not in combination with PEO.

PEO networks are described for lithium ion batteries in J. R. Nair et al., *Reactive and Functional Polymers* 2011, 71, 409-416. This reference, however, does not suggest the use of PFPE in combination therewith.

PFPE additives for electrolyte compositions are described in G. Marchionni et al., European Patent Application No. 1221733. At page 3 paragraph 17 matrixes having the function of separating the anode from the cathode in a battery containing the same to avoid short circuits are described, and it is said that the matrix material can be a solid polymer such as PEO. A homogeneous electrolyte composition comprising both PFPE and PEO is neither suggested nor described, and a copolymer of PFPE and PEO is neither suggested nor described.

The present invention is explained in greater detail in the specification set forth below. The disclosure of all United States patent references cited herein are to be incorporated herein by reference in their entirety.

DETAILED DESCRIPTION OF ILLUSTRATIVE EMBODIMENTS

Perfluoropolyethers (PFPEs) useful for carrying out the present invention are known. In some embodiments, the PFPE has a weight average molecular weight of from 0.4 or 0.8 Kg/mol, up to 15 or 20 Kg/mol, or more. Examples of perfluoropolyethers include but are not limited to those described in U.S. Pat. Nos. 8,084,405; 7,294,731; 6,608,138; 5,612,043; 4,745,009; 4,178,465; etc.

Polyethylene oxides (PEOs) useful for carrying out the present invention are also known. In some embodiments, the PEO has a weight average molecular weight of from 0.2 or 0.3 Kg/mol, up to 3 or 4 Kg/mol, or more. Numerous examples are known and include but are not limited to those described in U.S. Pat. Nos. 8,080,615; 7,897,080; 6,515,075; 5,618,316; etc.

Crosslinkable PFPEs and PEOs useful for carrying out some embodiments are also known. Such compounds generally include a PFPE or PEO main chain, with a cross-linkable group substituted on or covalently coupled to either or both end terminus thereof. In some embodiments, the cross-linkable group may also, or in the alternative, be coupled to one or more side-chains of the main chain. Suitable cross-linkable groups include, but are not limited to, ester groups such as methacrylate, vinyl groups such as styrene, carboxylic acid groups, amide or amidic groups, epoxy groups, etc. Examples include but are not limited to those described in U.S. Pat. Nos. 8,080,615 and 4,745,009, and in F. Pilati et al., *Macromolecules* 32, 6969-6976 (1999); R. Bongiovanni et al., *J. Appl Polym Sci* 75, 651-659 (2000); J. Rolland et al., *J. Am. Chem. Soc* 126, 2322-2323 (2004); Z. Hu et al., *Macromolecules* 42, 6999-7007 (2009); and R. Bongiovanni et al., *Polym Int.* 61, 65-73 (2012).

Alkali metal ion salts that can be used to carry out the present invention are also known or will be apparent to those skilled in the art. Any suitable salt can be used, including both lithium salts and sodium salts, and potassium salts: That is, salts containing lithium or sodium or potassium as a cation, and an anion. Any suitable anion may be used, examples of which include, but are not limited to, boron tetrafluoride, aluminate, (oxalate)borate, difluoro(oxalate)borate, phosphorus hexafluoride, alkylsulfonate, fluoroalkylsulfonate, arylsulfonate, bis(alkylsulfonyl)amide, perchlorate, bis(fluoroalkylsulfonyl)amide, bis(arylsulfonyl)amide, alkyl fluorophosphate, (fluoroalkylsulfonyl)(fluoroalkylcarbonyl)amide, halide, nitrate, nitrite, sulfate, hydrogen sulfate, alkyl sulfate, aryl sulfate, carbonate, bicarbonate, carboxylate, phosphate, hydrogen phosphate, dihydrogen phosphate, hypochlorite, an anionic site of a cation-exchange resin, and a mixture of any two or more thereof. See, e.g., Zhang et al., US Patent Application Publication No. 2012/0082903.

Methods of Making.

In the present invention, electrolyte compositions for an alkali metal ion battery, can be made without the use of flammable or otherwise undesirable organic solvents such as carbonate solvents.

In general, the compositions are made by combining perfluropolyether (PFPE), polyethylene oxide (PEO), alkali metal salt, and optionally a photoinitiator, in the absence of additional solvent. Any suitable conditions for combining can be used, including stirring, agitation, heat and/or pressure, for any suitable time, as required to obtain a single phase solution comprising, consisting of, or consisting essentially of a solvent system of the PFPE and PEO, and the alkali metal salt dissolved in the solvent system. Conditions and amounts may be adjusted as needed depending upon the particular choice of ingredients to achieve a solution with the salt dissolved therein. The composition can be used as an electrolyte in liquid form, or if desired crosslinked to provide a solid polymer or film electrolyte, as discussed further below.

The alkali metal salt may be included in the liquid or solid compositions in any suitable amount, typically from about 5 or 10 percent by weight, up to 20 or 30 percent by weight. Likewise, the solvent system or crosslinked polymer may be included in the composition in any suitable amount, typically from 70 or 75 percent by weight up to 85, 90 or 95 percent by weight.

The PFPE and PEO may be included in the solvent system in any suitable amount, such in a weight ratio (PFPE:PEO) range of between (on one end of the range) 40:60, 50:50, or 60:40, up to (on the other end of the range) 80:20, 90:10 or 95:5.

In some embodiments, the PFPE and PEO in the solvent system/composition are crosslinked to form a solid polymer having the alkali metal salt dissolved therein and formed into a suitable shape such as a film for use as an electrolyte by any suitable technique (e.g., casting, spraying, coating, dipping, etc.), The crosslinking step may be carried out by any suitable technique, such as by adding an initiator and, if necessary, heating or irradiating (e.g., with light or actinic radiation) the composition in a manner appropriate for the particular initiator. Any suitable initiator can beused, including but not limited to photoinitiators such as Norrish Type I photoinitiators, thermal initiators, free radical generators, photoacid generators, etc. Examples include but are not limited to those set forth in U.S. Pat. Nos. 8,197,943; 8,133,580; 7,429,409; 6,958,256; 5,506,279, etc.

If desired, an electrode stabilizing agent can be added to or included in the electrolyte compositions (in some embodiments before cross-linking thereof), in accordance with known techniques. See, e.g., Zhang et al., US Pat. App. Pub No. 2012/0082903. For example, the electrolytes can include an electrode stabilizing additive that can be reduced or polymerized on the surface of a negative electrode to form a passivation film on the surface of the negative electrode. Likewise, the electrolytes can include an electrode stabilizing additive that can be oxidized or polymerized on the surface of the positive electrode to form a passivation film on the surface of the positive electrode. In some embodiments, electrolytes can include mixtures of the two types of electrode stabilizing additives. The additives are typically present at a concentration of about 0.001 to 8 wt %. For example, an electrode stabilizing additive can be a substituted or unsubstituted linear, branched or cyclic hydrocarbon comprising at least one oxygen atom and at least one aryl, alkenyl or alkynyl group. The passivating film formed from such electrode stabilizing additives may also be formed from a substituted aryl compound or a substituted or unsubstituted heteroaryl compound where the additive comprises at least one oxygen atom. Numerous particular examples are described in Zhang et al. at paragraphs 173-174 therein.

If desired, fillers or conductivity enhances may optionally be included in the electrolyte compositions. Examples include but are not limited to include but are not limited to $Al_2O_3$, AlOOH, $BaTiO_3$, BN, $LiN_3$ $LiAlO_2$, lithium fluorohectorite, and/or fluoromica clay. Finally, additives such as hexamethyldisilazane (HMDS) may also be included to improve interfacial resistance in a lithium cell and trap (react) with any available water and that may be present and detrimental to cell performance. See, US Patent App. Pub. No. 2011/0311881 at paragraphs 87-88.

Alkali Metal Batteries.

An alkali metal battery (sometimes also referred to as alkali metal ion batteries, and including alkali metal-air batteries) of the present invention generally includes (a) an anode; (b) a cathode; (c) a liquid or solid electrolyte composition as described above operatively associated with the anode and cathode, and (d) optionally a separator for physically separating the anode and cathode (See, e.g., M. Armand and J.-M. Tarascon, Building Bettery Batteries, *Nature* 451, 652-657 (2008)). Examples of suitable battery components include but are not limited to those described in U.S. Pat. Nos. 5,721,070; 6,413,676; 7,729,949; and 7,732,100, and in US Patent Application Publication Nos. 2009/0023038; 2011/0311881; and 2012/0082930; and S.-W. Kim et al., *Adv. Energy Mater.* 2, 710-721 (2012).

Examples of suitable anodes include but are not limited to anodes formed of lithium metal, lithium alloys, sodium metal, sodium alloys, carbonaceous materials such as graphite, and combinations thereof. Examples of suitable cathodes include, but are not limited to cathodes formed of transition metal oxides, doped transition metal oxides, metal phosphates, metal sulfides, lithium iron phosphate, and combinations thereof. See, e.g., U.S. Pat. No. 7,722,994. Additional examples include but are not limited to those described in Zhang et al., US Pat. App. Pub No. 2012/0082903, at paragraphs 178 to 179. In some embodiments, an electrode such as a cathode can be a liquid electrode, such as described in Y. Lu et al., *J. Am. Chem. Soc.* 133, 5756-5759 (2011). Numerous carbon electrode materials, including but not limited to carbon foams, fibers, flakes, nanotubes and other nanomaterials, etc., alone or as composites with each other or other materials, are known and described in, for example, U.S. Pat. Nos. 4,791,037; 5,698,341; 5,723,232; 5,776,610; 5,879,836; 6,066,413; 6,146,791; 6,503,660; 6,605,390; 7,071,406; 7,172,837; 7,465,519; 7,993,780; 8,236,446, and 8,404,384. In an alkali metal-air battery such as a lithium-air battery, sodium-air battery, or potassium-air battery, the cathode is preferably permeable to oxygen (e.g., mesoporous carbon, porous aluminum, etc.), and the cathode may optionally contain a metal catalyst (e.g., manganese, cobalt, ruthenium, platinum, or silver catalysts, or combinations thereof) incorporated therein to enhance the reduction reactions occurring with lithium ion and oxygen at the cathode. See, e.g., U.S. Pat. No. 8,012,633 and US Patent Application Publication Nos. 2013/0029234; 2012/0295169; 2009/0239113; see also P. Hartmann et al., A rechargeable room-temperature sodium superoxide ($NaO_2$) battery. *Nature Materials* 12, 228-232 (2013).

Where the electrolyte composition is a liquid composition, a separator formed from any suitable material permeable to ionic flow can also be included to keep the anode and cathode from directly electrically contacting one another. Examples of suitable separators include, but are not limited to, porous membranes or films formed from organic polymers such as polypropylene, polyethylene, etc., including composites thereof. See generally P. Arora and Z. Zhang, Battery Separators, *Chem. Rev.* 104, 4419-4462 (2004). When the electrolyte composition is a solid composition, particularly in the form of a film, it can serve as its own separator. Such solid film electrolyte compositions of the present invention may be of any suitable thickness depending upon the particular battery design, such as from 0.01, 0.02, 0.1 or 0.2 microns thick, up to 25, 30, or 50 microns thick, or more.

All components of the battery can be included in or packaged in a suitable rigid or flexible container with external leads or contacts for establishing an electrical connection to the anode and cathode, in accordance with known techniques.

The present invention is explained in greater detail in the following non-limiting Examples.

EXAMPLE 1

Characterization

Thermogravimetric analysis for Liquid Blends. Thermogravimetric analysis (TGA) was performed using a Perkin Elmer, Pyris I TGA apparatus. Scan was made under nitrogen atmosphere from 20° C. to 600° C. with a heating rate of 10° C/minute.

Differential Scanning calorimetry for Liquid Blends. Glass transition state ($T_g$), crystallization ($T_c$) and melting temperatures ($T_m$) were measured using a differential scanning calorimeter (DSC) (TA Instruments, DSC Q 200) in air using the method of heat/cool/heat at a heating and cooling rate of 10° C. and 5° C/minute respectively, over a temperature range of −130° C. to 100° C. The $T_g$ was determined using the midpoint method on the second heating cycle thermogram. The $T_c$ and $T_m$ were determined as the peak maximum and minimum of the cooling and heating cycle respectively.

Differential Scanning calorimetry for Solid State Elastomers. Differential scanning calorimetric measurements (DSC) (TA Instruments, DSC Q 200) were used to measure solid polyelectrolyte glass transition temperature ($T_g$), and crystallization ($T_c$) and melting ($T_m$) temperatures. DSC analysis were performed in air, using the method of heat/cool/heat at a heating and cooling rate of 10° C. and 5° C./minute respectively over a temperature range of −130° C. to 100° C. The $T_g$ was determined using the midpoint method on the second heating cycle thermogram. The $T_c$ and $T_m$ were determined as the peak maximum and minimum of the cooling and heating cycle respectively.

Ionic Conductivity for Liquid Blends. Electrochemical measurements were obtained in a procedure similar to that previously reported by Teran et. al. (*Solid State Ionics* 203, 18-21 (2011). In brief, the polyelectrolyte blends were placed in conductivity cells that were built to enable examination of samples with a wide range of viscosities. Sample thicknesses were determined by subtracting the thickness of the lower and upper electrodes from the overall assembled cell thickness. The thicknesses ranged from 1 to 2.5 mm.

A home-made temperature controlled box was used to house the cells during the electrochemical experiments. The AC impedance spectroscopy measurements, performed using a 16-channel Bio-Logic VMP3 potentiostat, were made across the frequency range 1 MHz to 10 Hz at a peak-to-peak amplitude voltage of 20 mV. The electrolyte resistance, R, was determined by the low-frequency minimum on a Nyquist impedance plot. Measurements were made at a series of temperatures with a minimum of 2 h calibration at each temperature. All data presented in this work are from heating runs. Calculating the sample conductivity from the measured resistance R requires knowledge of both the electrode separation, L, and the effective cross-sectional area $A_{eff}$. To find the effective area of a conductivity cell with two unequally sized electrodes, the experimental set-up was modeled in COMSOL Multiphysics. Solving Laplace's equation for the primary current distribution in the polymer electrolyte yielded the steady state current, 1, through the electrodes as a function of applied voltage, V and assumed value of electrolyte conductivity, amodel. These were used to calculate the effective cross-sectional area by Aeff=LI/(Vσmodel). The linearity of Laplace's equation means that Aeff depends only on geometry and is independent of V and σ model. The numerical data were found to obey the empirical equation, $$A_{eff} = 0.0023 L^3 - 0.0291 L^2 + 0.135 L + 0.498$$

Sample conductivity, σ, was calculated using σ=L/(AeffR). Three samples from each electrolyte were tested, with error bars of data points representing the standard deviation. The exception was PEO (5000)/LiTFSI, for which only one sample was run. The accuracy of our procedure was verified using an aqueous KCl conductivity standard. Conductivity measurements were made between 330 and 368 K. The PEO/LiTFSI mixtures are in the amorphous state in this temperature $$\sigma = \frac{L}{A_{eff} R} \quad (3)$$

$$A_{eff} = 0.0023 L^3 - 0.0291 L^2 + 0.135 L + 0.498$$

Ionic Conductivity of Solid State Elastomers. Crosslinked films were cut into 1 cm diameter disks and blocked between stainless steel electrodes. The AC impedance spectroscopy measurements were made using a homemade test cell on thermostated pressed samples in the glovebox.

Ionic conductivity was calculated from the complex impedance data ($Z^* = Z' - iZ''$) collected at temperatures between 40° C. and 120° C. All of the samples were annealed at 120° C. for 1 h prior to commencement of the conductivity measurements.

The bulk resistance of the electrolyte, R, is based on the diameters of Z' vs Z" Nyquist plot semicircles. The ionic conductivity is given by: σ=R/LA; where L is the electrolyte thickness and A is the area in contact with the current collectors. Three samples from each electrolyte were tested, with error bars of data points representing the standard deviation.

Cyclic Voltammetry. Electrochemical measurements were performed in a one-compartment cell using a glassy carbon working electrode (0.07 cm² surface area). A platinum wire was used as a counter electrode. Potentials were referenced to Ag/AgCl (aqueous, 3M NaCl) without regard for the liquid junction. The working electrode was polished (1-micron alumina dispersed in water) prior to use, followed by washing with water and acetone.

Electrochemical experiments were performed using a CH Instruments Electrochemical Workstation 660D potentiostat. In a typical experiment, a neat solution of the ionic liquid was degassed with argon for at least five minutes (typically fifteen minutes) prior to electrochemical cycling. The working, reference, and counter electrodes were placed in the degassed ionic liquid, and cycling was performed over a wide electrochemical window (typically -5 V to 5 V).

Flammability. Sustained burning of polymeric liquids was measured by a modified ASTM D-4206 procedure. In brief, a Koehler Rapid Flash Tester apparatus was used ad the temperature of the control unit was set to 235 degrees Celsius. Two mL of each sample was deposited into the depression of the aluminum testing block. During the 60 second warming period, the gas jet assembly is set in the "off" position (gas jet is positioned so that the flame is away from the depression), and the flame is ignited. Using the machinist scale, the flame is adjusted so that it is 2.2 mm above the lip of the depression and 4 mm in diameter. After 60 seconds (determined to be length of time to allow sample to equilibrate with block), the flame is positioned over the center of the depression (the "on" position). The flame is left there for 15 seconds. After 15 seconds passes, the flame is placed in the "off" position. The sustained combustion properties of the material is observed and recorded per the following criteria: The material under test is considered to sustain burning if the material: a) ignites when the flame is over the well and burning is sustained for more than 15 seconds, or b) flashes and burns when the test flame is in the "off" position prior to swinging it over the well.

EXAMPLE 2

Preparation of PFPE/PEO Liquid Blend 10 wt % of lithium salt was added directly to PFPE, PFPE:PEO, and PEO blends and stirred at room temperature for about 12 h. The concentration of salt in the electrolytes is specified by r defined as the ratio of lithium salt (LiTFSI: 287.09 g/mol, LiNFBS: 306.03 g/mol) and polymer repeating units (the average molecular weights of the repeating unit in PEO and PFPE are 44.05 g/mol and 100.22 g/mol respectively). Thus, r is the molar ratio of $Li^+$ ions to ethylene oxide and perfluoroether moieties, $r=[Li^+]/([EO]+[PFE])$, without accounting for the —OH end groups of each of the polymer chains.

EXAMPLE 3

Preparation of PFPE/PEO Solid State Elastomer

Perfluoropolyether dimethacrylate (PFPE-DMA) was synthesized as previously reported (see, e.g., J. Rolland et al., *J. Am. Chem. Soc.* 126, 2322-2323 (2004); Z. Hu et al., *Macromolecules* 42, 6999-7007 (2009)). Briefly, commercially available hydroxy-terminated PFPEs (Fluorolink D10, average $M_w$=1000 g mol$^{-1}$, and Fluorolink D, average $M_w$~2000 g mol$^{-1}$, both from Solvay Solexis) were treated with isocyanato ethyl methacrylate (Aldrich) to obtain a clear, colorless, pourable and viscous oil.

Poly(ethylene glycol) dimethacrylate (PEO-DMA) with an average $M_n$ of 550 g mol$^{-1}$ was obtained from Sigma Aldrich. The commercial PEO-DMA, before use, was first passed through a chromatographic column (with neutral alumina) to remove any inhibitor.

Lithium bistrifluoromethylsulfonyl imide (LiTFSI) and lithium nonofluorobutane sulfonate (LiNFBS) were obtained from Acres Organics and TCI America respectively.

Argon glove-boxes (MBraun and Vacuum Atmospheres Company) with oxygen and water at sub-ppm levels were used for all sample preparations and testing steps. All polymers were dried at 40° C. under vacuum in a glovebox antechamber for at least 24 h. LiTFSI and LiNFBS were dried at 120° C. under vacuum in a glovebox antechamber for three days.

6 or 10 wt % of lithium salt was added directly to PFPE-DMA, PFPE-DMA:PEO-DMA (composition weight ratio of 80:20), and PEO-DMA blends; moreover 0.5 wt % of the photoinitiator 1-hydroxycyclohexyl phenyl ketone (HCPK, Aldrich) was dissolved into the solutions to make photocurable liquid resins. The mixtures were stirred at room temperature for about 12 h and colorless, clear and homogeneous liquid blends were obtained.

Polymer solutions were cast on a Si wafer by means of a Doctor Blade (standard aluminum single blade) to obtain films with a thickness of around 100 µm. Subsequent photocuring of the material was accomplished through UV irradiation, with a Light Exposure System ELC-500 (ElecroLite Corporation, λ-365 nm) for 4 min. This resulted in a completely clear, elastomeric material.

The foregoing is illustrative of the present invention, and is not to be construed as limiting thereof. The invention is defined by the following claims, with equivalents of the claims to be included therein.

That which is claimed is:

1. A liquid electrolyte composition, comprising:
   (a) a homogeneous solvent system, said solvent system comprising a perfluoropolyether (PFPE) and polyethylene oxide (PEO); and
   (b) an alkali metal salt dissolved in said solvent system, wherein said PFPE and said PEO are included in said solvent system in a weight ratio (PFPE:PEO) of from 40:60 to 95:5.

2. The composition of claim 1, wherein said alkali metal salt is a lithium salt.

3. The composition of claim 1, wherein said alkali metal salt is a sodium salt.

4. The composition of claim 1, wherein
   said solvent system is included in said composition in an amount of from 70 to 95 percent by weight; and
   said salt is included in said composition in an amount of from 5 to 30 percent by weight.

5. The composition of claim 1, wherein:
   said PEO has a weight average molecular weight of from 0.2 to 4 Kg/mol, and
   said PFPE has a weight average molecular weight of from 0.4 to 20 Kg/mol.

6. The composition of claim 1, wherein said PEO and said PFPE are crosslinkable.

7. The composition of claim 1, further comprising an initiator and/or an electrode stabilizing agent.

8. The composition of claim 1, wherein said composition is substantially free of carbonate solvent.

9. The composition of claim 1, wherein said composition has a $T_g$ between $-120°$ C. and $-20°$ C.

10. The composition of claim 1, wherein said composition does not ignite when heated to a temperature of 235° C. and then contacted to a flame for 15 seconds in a Kohler open cup rapid flash test apparatus.

11. The composition of claim 1, wherein said composition has an electrochemical stability window of from 3 to 6 volts against $Li/Li^+$.

12. A solid electrolyte composition for a battery, comprising:
   (a) a solid polymer, said polymer comprising a crosslinked product of a crosslinkable perfluoropolyether (PFPE) and a crosslinkable polyethylene oxide (PEO); and
   (b) an alkali metal salt dissolved in said polymer, wherein said PFPE and said PEO are included in said solid polymer in a weight ratio (PFPE:PEO) of from 40:60 to 95:5.

13. The composition of claim 12, wherein said alkali metal salt is a lithium salt.

14. The composition of claim 12, wherein said alkali metal salt is a sodium salt.

15. The composition of claim 12, wherein said composition is in the form of a film.

16. The composition of claim 12, wherein said polymer is amorphous.

17. The composition of claim 12, wherein
   said solid polymer is included in said composition in an amount of from 70 to 95 percent by weight; and
   said salt is included in said composition in an amount of from 5 to 30 percent by weight.

18. The composition of claim 12, wherein:
   said PEO has a weight average molecular weight of from 0.2 to 4 Kg/mol, and
   said PFPE has a weight average molecular weight of from 0.4 to 20 Kg/mol.

19. The composition of claim 12, further comprising an initiator and/or an electrode stabilizing agent.

20. The composition of claim 12, wherein said composition is substantially free of carbonate solvent.

21. The composition of claim 12, wherein said composition has a $T_g$ between $-120°$ C. and $-20°$ C.

22. The composition of claim 12, wherein said composition does not ignite when heated to a temperature of 235° C. and then contacted to a flame for 15 seconds in a Kohler open cup rapid flash test apparatus.

23. The composition of claim 12, wherein said composition has an electrochemical stability window of from 3 to 6 volts against $Li/Li^+$.

24. A battery, comprising:
   (a) an anode;
   (b) a cathode; and
   (c) a solid electrolyte composition operatively associated with said anode and cathode, wherein said solid electrolyte composition is the composition of claim 12.

25. A battery, comprising:
   (a) an anode;
   (b) a cathode; and
   (c) a liquid electrolyte composition operatively associated with said anode and cathode, wherein said liquid electrolyte composition comprises (a) a homogeneous solvent system comprising a perfluoropolyether (PFPE) and polyethylene oxide (PEO) and (b) an alkali metal salt dissolved in said solvent system.

26. A method of making an electrolyte composition for a battery, comprising:
   (a) combining perfluoropolyether (PFPE), polyethylene oxide (PEO), alkali metal salt, and optionally a photoinitiator, in the absence of additional solvent under conditions in which a single phase solution solvent system is formed; and then optionally
   (b) crosslinking said PFPE and said PEO to form a solid polymer having said alkali metal salt dissolved therein.

27. The method of claim 26, wherein
   said solvent system is included in said composition in an amount of from 70 to 95 percent by weight;
   said salt is included in an amount of from 5 to 30 percent by weight; and
   said PFPE and said PEO are included in said solvent system in a weight ratio (PFPE:PEO) of from 40:60 to 95:5.

28. The method of claim 26, wherein said alkali metal salt is a lithium salt or sodium salt.

* * * * *

UNITED STATES PATENT AND TRADEMARK OFFICE
CERTIFICATE OF CORRECTION

PATENT NO. : 9,748,604 B2  
APPLICATION NO. : 14/436603  
DATED : August 29, 2017  
INVENTOR(S) : DeSimone et al.

It is certified that error appears in the above-identified patent and that said Letters Patent is hereby corrected as shown below:

In the Specification

Column 7, Line 4: Please correct "current, l, through" to read -- current, I, through --
  Line 6: Please correct "amodel. These" to read -- σmodel. These --

Column 8, Line 44: Please correct "$M_w$ –2000 g mol$^{-1}$" to read -- $M_w$ =2000 g mol$^{-1}$ --

Signed and Sealed this  
Twenty-ninth Day of May, 2018

Andrei Iancu  
*Director of the United States Patent and Trademark Office*